US006318163B1

(12) United States Patent
Kraemer

(10) Patent No.: US 6,318,163 B1

(45) Date of Patent: Nov. 20, 2001

(54) METHOD AND APPARATUS FOR DETERMINING THE THROTTLE VALVE ANGLE

(75) Inventor: Gerd Kraemer, Baierbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/434,275

(22) Filed: Nov. 5, 1999

(30) Foreign Application Priority Data

Nov. 19, 1998 (DE) .............................................. 198 53 410

(51) Int. Cl.[7] .................................................... G01M 15/00

(52) U.S. Cl. ............................................................ 73/118.2

(58) Field of Search .................................... 73/118.2, 116, 73/117.2, 117.3, 118.1; 340/438, 439; 701/101, 102, 103, 110; 33/611, 600; 123/336, 337, 403

(56) References Cited

U.S. PATENT DOCUMENTS

| | | | |
|---|---|---|---|
| 4,549,517 | 10/1985 | Kamiyama . | |
| 4,739,742 | 4/1988 | Staerzl . | |
| 4,974,563 | 12/1990 | Ikeda et al. . | |
| 5,273,019 | 12/1993 | Matthews . | |
| 5,282,449 | 2/1994 | Takahashi et al. . | |
| 5,293,553 | 3/1994 | Dudek et al. . | |
| 5,339,681 * | 8/1994 | Sekozawa et al. | 73/118.2 |
| 5,349,933 * | 9/1994 | Hasegawa et al. . | |
| 5,406,920 | 4/1995 | Murata et al. . | |
| 5,597,951 * | 1/1997 | Yoshizaki et al. | 73/118.2 |

FOREIGN PATENT DOCUMENTS

| | | |
|---|---|---|
| 3504181C2 | 8/1985 | (DE) . |
| 3842075A1 | 6/1990 | (DE) . |
| 4319015 | 12/1994 | (DE) . |
| 19648159A1 | 6/1997 | (DE) . |
| 19612451A1 | 10/1997 | (DE) . |
| 19802843 | 7/1998 | (DE) . |
| 0742358A1 | 11/1996 | (EP) . |
| WO96/32579 | 10/1996 | (WO) . |
| WO97/35106 | 9/1997 | (WO) . |

OTHER PUBLICATIONS

German Patent Office Search Report, May 18, 1999.

* cited by examiner

*Primary Examiner*—Eric S. McCall

(74) *Attorney, Agent, or Firm*—Crowell & Moring LLP

(57) ABSTRACT

A method for determining the throttle valve angle includes determination of the throttle valve position using a throttle valve model from a rate of air flow and a differential pressure across the throttle valve. For reducing the application expenditures and for permitting the throttle valve angle determination also at low differential pressures across the throttle valve, the throttle valve model is determined from an undercritical rate of air flow through the throttle valve, the throttle valve model containing at least two characteristic diagrams, of which the first contains at least two characteristic curves which describe the relationship between the throttle valve angle and the rate of air flow at different differential pressures, and the second characteristic diagram indicates the non-linear transition between the characteristic curves existing in the first characteristic diagram.

18 Claims, 2 Drawing Sheets

METHOD AND APPARATUS FOR DETERMINING THE THROTTLE VALVE ANGLE

BACKGROUND AND SUMMARY OF THE INVENTION

This application claims the priority of German application 198 53 410.8, filed in Germany on Nov. 19, 1998, the disclosure of which is expressly incorporated by reference herein.

The invention relates to a method for determining the throttle valve angle in which the throttle valve position is determined by means of a throttle valve model from a rate of air flow and a differential pressure across the throttle valve.

In the case of throttled engines, a throttle valve model is conventionally used in the engine timing system for the model-type description of the throttle valve position. This throttle valve model is usually established from the super-critical rate of air flow through the throttle valve and a reduction factor calculated at an uncritical differential pressure. The inverting of the throttle valve model permits a determination of the throttle valve angle from a predetermined rate of air flow as well as a differential pressure across the throttle valve.

The disadvantage of the above-mentioned approach is the lack of precision in the range of differential pressures between 50 and 100 mbar. At differential pressures lower than 50 mbar, a throttle valve determination from the above-mentioned model can no longer be made in a meaningful manner.

It is an object of the invention to provide a method for determining the throttle valve angle, in the case of which a throttle valve position is also possible at low differential pressures.

This object is achieved by means of an apparatus and method, wherein the throttle valve model is determined from an undercritical rate of air flow through the throttle valve and contains at least two characteristic diagrams, the first characteristic diagram indicating at least two characteristic curves which describe the relationship between the throttle valve angle and the rate of air flow at different differential pressures, and the second characteristic diagram indicating a non-linear transition between the characteristic curves existing in the first characteristic diagram.

In this case, it is important for the invention that another throttle valve model is used which was determined by using as the basis an undercritical rate of air flow. The rate of air flow may be determined from the torque requirement. According to the invention, two characteristic diagrams are used, the first of which containing at least two characteristic curves which describe the relationship of the throttle valve angle with respect to the rate of air flow at different differential pressures, and the second characteristic diagram indicating the non-linear transition between the characteristic curves present in the first characteristic diagram.

By means of the present invention, the required throttle valve angle can be set at any load and rotational speed as well as desired differential pressure. Such a precise and controlled adjustment is required particularly also for rinsing an activated carbon filter.

The differential pressure can be determined by way of a characteristic diagram or from the tank ventilation demand.

When determining the rate of air flow by way of the throttle valve, the rate of air flow by way of a tank ventilation valve is preferably also taken into account and the throttle valve is correspondingly closed when the tank ventilation valve is opened.

In addition, system errors, such as leakage air errors, mechanical tolerances of the throttle valve and errors of the electric throttle valve position detection can also be recognized and can be used in the form of an adaptation for correcting the throttle valve angle.

Other objects, advantages and novel features of the present invention will become apparent from the following detailed description of the invention when considered in conjunction with the accompanying drawings.

DETAILED DESCRIPTION OF THE DRAWINGS

Figure 1:
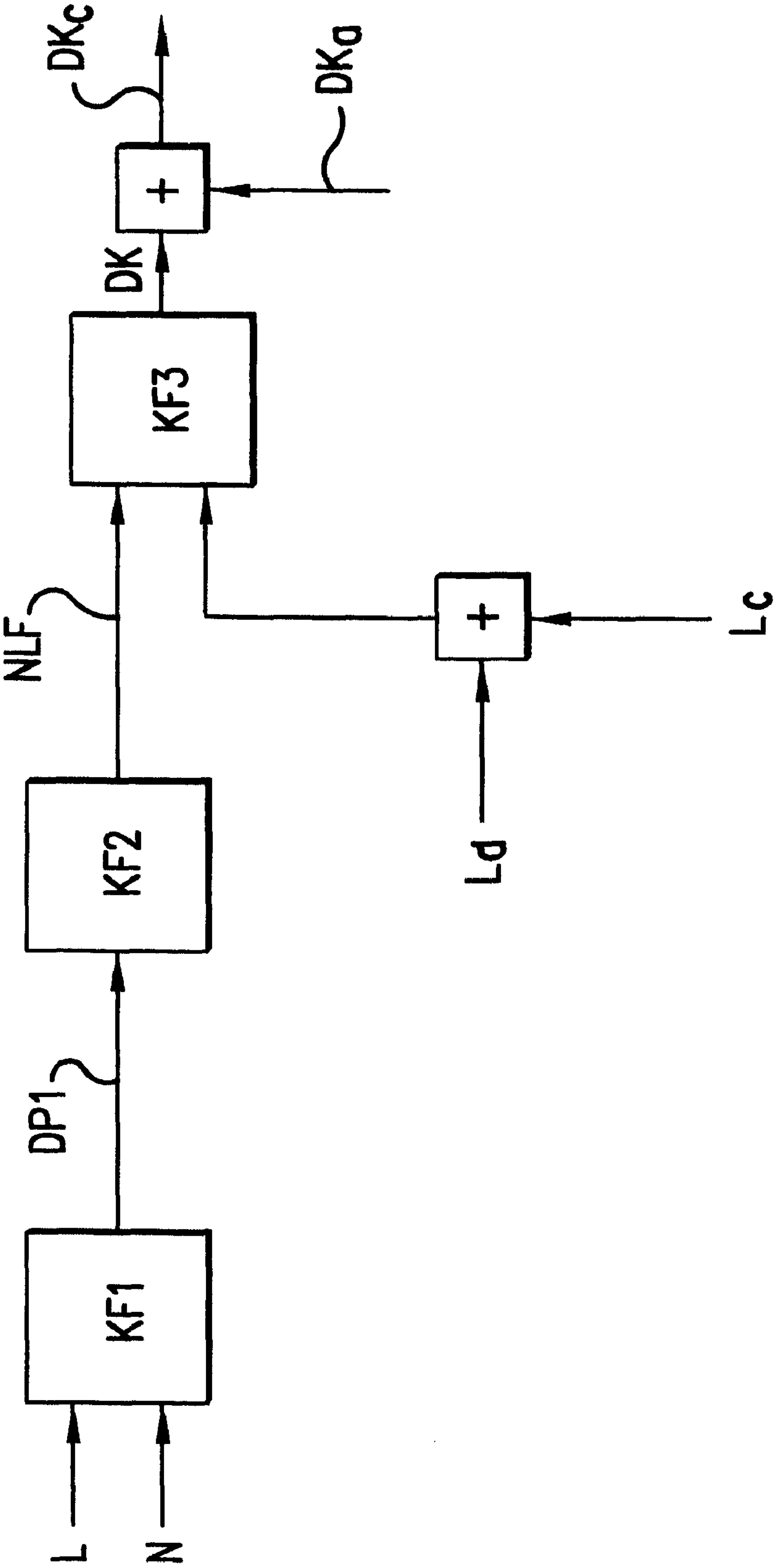
FIG. 1 is a schematic block diagram of a throttle valve model used in the process according to the invention.

In the case of the method illustrated as an example in the drawings, the input quantities load L and rotational speed N are detected, and, according to the data of a characteristic diagram KF1, the required differential pressure DP1 across the throttle valve is determined therefrom. As an alternative or in addition, the differential pressure can also be influenced by the tank ventilation function.

In another characteristic diagram KF2, as a function of the differential pressure DPl, a factor NLF is determined for a nonlinear transition. This factor is read into another characteristic diagram KF3. Information concerning the desired load $L_d$ is also entered into this characteristic diagram KF3, which load had been adapted in an adder by means of a correction value $L_c$.

Figure 2:
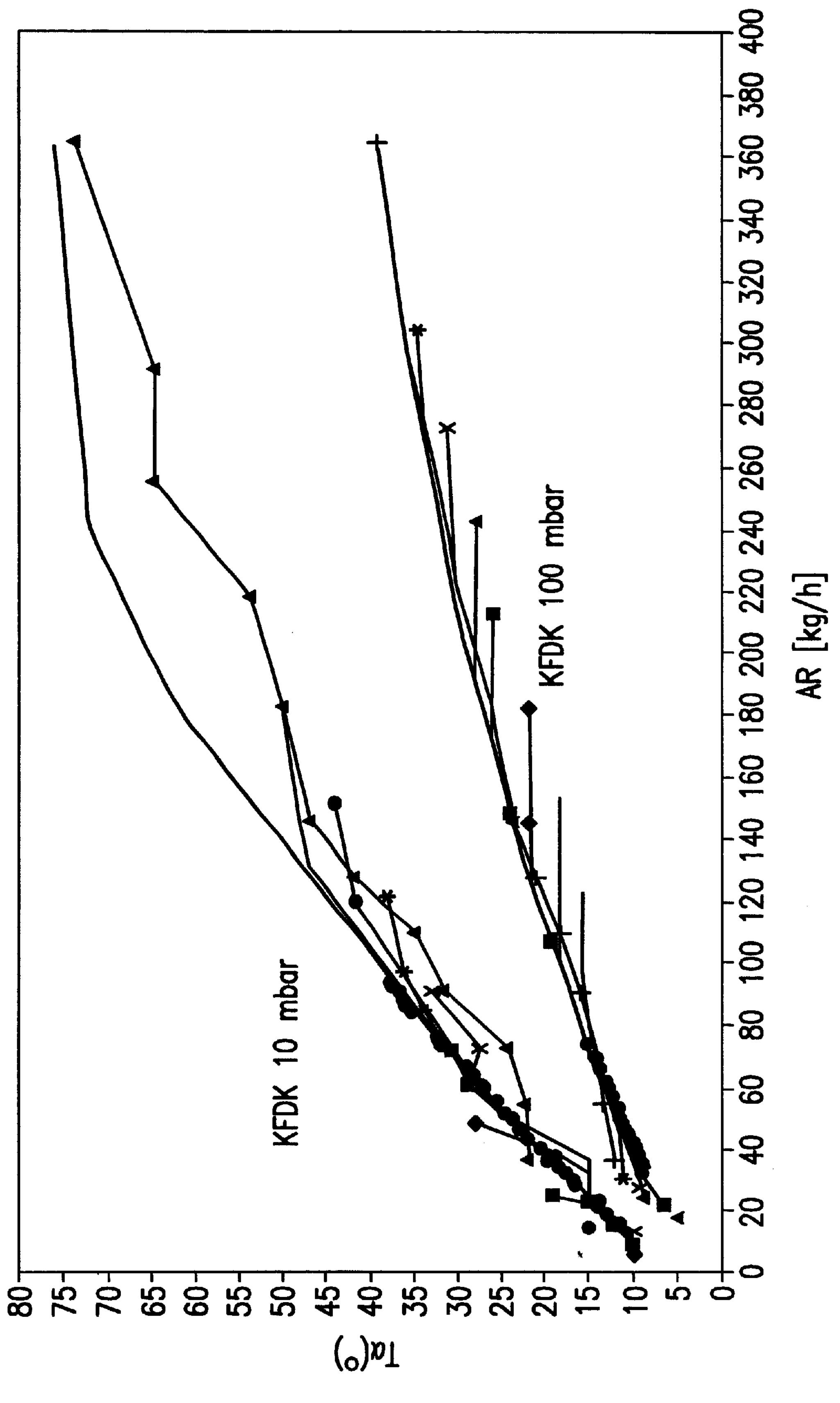
FIG. 2 is a diagram having two characteristic curves which indicate the relationship between the air flow rate and the throttle valve angle at two different differential pressures.

In this case, two characteristic curves are filed in the characteristic diagram KF3 which are illustrated as examples in FIG. 2. FIG. 2 is a graph showing the throttle valve angle Tα as a function of the air flow rate AR, specifically for two different differential pressures—throttled KFDK-10 mbar—and partially throttled KFDKT-100 mbar. The rate of air flow AR in kilograms per hour (Kg/h) can be determined from the torque demand as a function of the desired load Ld and the load correction $L_c$. In addition, a throttle valve position DK is determined from the two characteristic curves as well as the factor for the non-linear transition between these curves.

This throttle valve position is also corrected by means of an adaptation value DKa which may contain a component-related adaptation, for errors because of leakage air, mechanical tolerances or errors in the electric throttle valve position detection.

At the end, a corrected throttle valve position $DK_c$ is obtained which permits a precise throttle valve position determination also at low differential pressures, thus during the operation of an internal-combustion engine in the partial load range or in the idling range. By means of which required pressure conditions can be created, for example, for the activated carbon filter rinsing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for determining a throttle valve angle of a throttle valve, comprising:

determining a throttle valve model based on an undercritical rate of air flow through the throttle valve, said throttle valve model containing at least two characteristic diagrams, a first of the characteristic diagrams indicating at least two characteristic curves representing a relationship between the throttle valve angle and a rate of air flow at respective different differential pressures, a second of the characteristic diagrams indicating a non-linear transition between the characteristic curves of the first characteristic diagram, and determining the throttle valve angle based on the rate of air flow through the throttle valve and on the throttle valve model.

2. Method according to claim 1, wherein the rate of air flow is determined from a torque demand.

3. Method according to claim 2, wherein the differential pressure is determined from a characteristic diagram or a tank ventilation demand.

4. Method according to claim 2, wherein leakage air errors, mechanical tolerances of the throttle valve and errors of the electric throttle valve position detection are detected and, as a function thereof, an error adaptation of the determined throttle valve angle is carried out.

5. Method according to claim 1, wherein the differential pressure is determined from a characteristic diagram or a tank ventilation demand.

6. Method according to claim 5, wherein leakage air errors, mechanical tolerances of the throttle valve and errors of the electric throttle valve position detection are detected and, as a function thereof, an error adaptation of the determined throttle valve angle is carried out.

7. Method according to claim 1, wherein the rate of air flow is taken into account by way of a tank ventilation valve and, when the tank ventilation valve is opened, the throttle valve is closed correspondingly.

8. Method according to claim 7, wherein leakage air errors, mechanical tolerances of the throttle valve and errors of the electric throttle valve position detection are detected and, as a function thereof, an error adaptation of the determined throttle valve angle is carried out.

9. Method according to claim 1, wherein leakage air errors, mechanical tolerances of the throttle valve and errors of the electric throttle valve position detection are detected and, as a function thereof, an error adaptation of the determined throttle valve angle is carried out.

10. Apparatus for determining a throttle valve angle of a throttle valve comprising:

means for determining a throttle valve model based on an undercritical rate of air flow through the throttle valve, said throttle valve model containing at least two characteristic diagrams, a first of the characteristic diagrams indicating at least two characteristic curves representing a relationship between the throttle valve angle and a rate of air flow at respective different differential pressures, a second of the characteristic diagrams indicating a non-linear transition between the characteristic curves of the first characteristic diagram, and means for determining the throttle valve angle based on the rate of air flow through the throttle valve and on the throttle valve model.

11. Apparatus according to claim 10, comprising means for determining the rate of a air flow from a torque demand.

12. Apparatus according to claim 11, comprising means for determining the differential pressure from one of a characteristic diagram and a tank ventilation demand.

13. Apparatus according to claim 11, comprising means for carrying out an error adaptation of the throttle valve as a function of leakage air errors, mechanical tolerances of the throttle valve and errors of an electrical throttle valve position detection means.

14. Apparatus according to claim 10, comprising means for determining the differential pressure from one of a characteristic diagram and a tank ventilation demand.

15. Apparatus according to claim 14, comprising means for carrying out an error adaptation of the throttle valve as a function of leakage air errors, mechanical tolerances of the throttle valve and errors of an electrical throttle valve position detection means.

16. Apparatus according to claim 10, comprising means for taking into account the rate of air flow by way of a tank ventilation valve which when opened is accompanied by corresponding closing of the throttle valve.

17. Apparatus according to claim 16, comprising means for carrying out an error adaptation of the throttle valve as a function of leakage air errors, mechanical tolerances of the throttle valve and errors of an electrical throttle valve position detection means.

18. Apparatus according to claim 10, comprising means for carrying out an error adaptation of the throttle valve as a function of leakage air errors, mechanical tolerances of the throttle valve and errors of an electrical throttle valve position detection means.

* * * * *